Patented Mar. 27, 1951

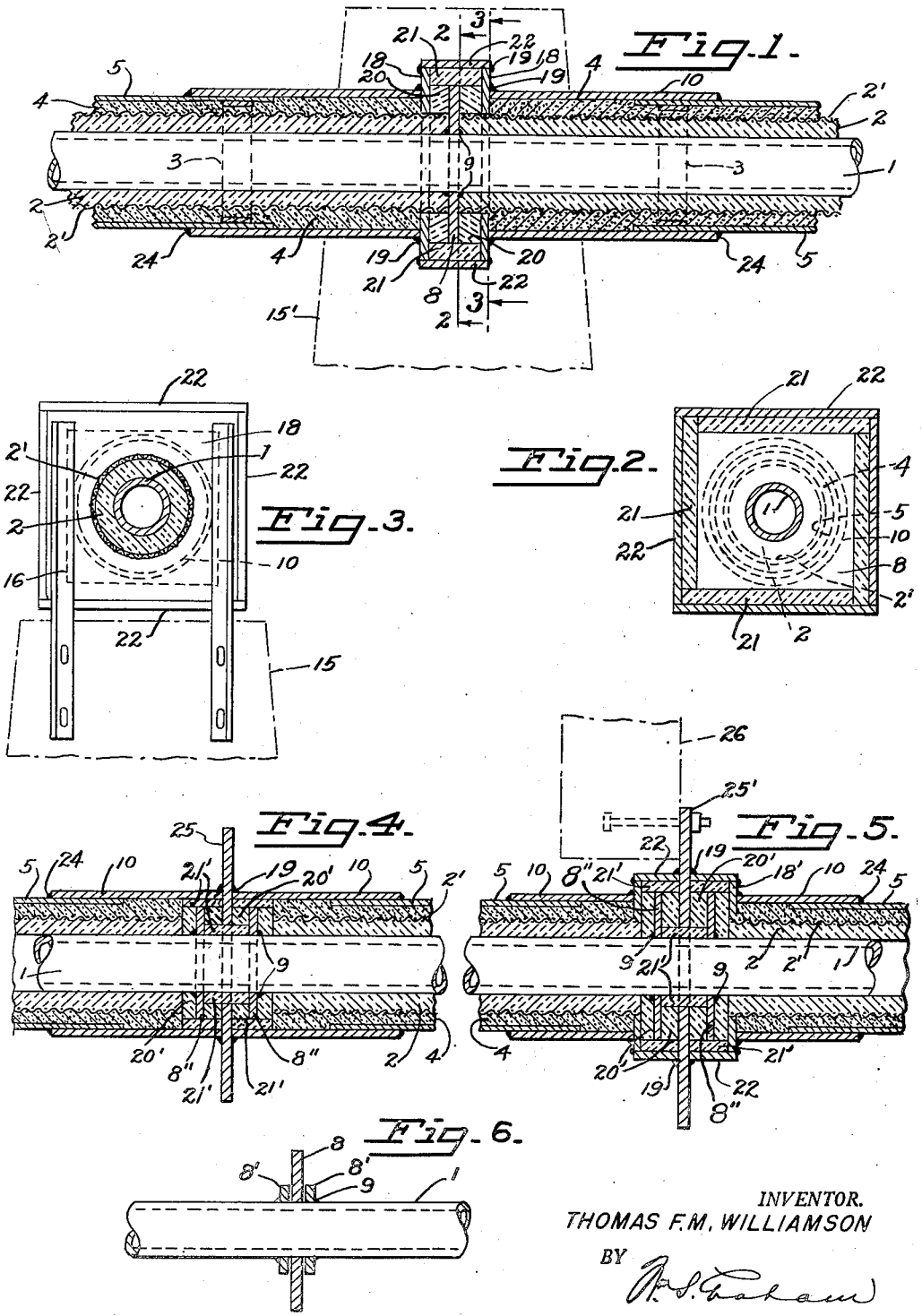

2,546,533

UNITED STATES PATENT OFFICE 2,546,533

ANCHOR FOR PIPES

Thomas F. M. Williamson, San Francisco, Calif., assignor to Alexander H. Isenberg, Woodside, Calif.

Original application March 18, 1946, Serial No. 655,294. Divided and this application November 13, 1947, Serial No. 785,633

4 Claims. (Cl. 248—49)

This application is a division or continuation in part of my copending application filed under Serial 655,294, March 18, 1946.

This invention relates to thermal insulated pipe of the general type wherein a metal pipe is surrounded with thermal insulation, and preferably surrounding this is a heavy layer of water sealing compound such as solid asphalt, tar, or pitch, and a metal or other casing surrounds the pitch (all as generally shown in my copending patent applications filed under Serial Nos. 633,812 and 651,848, filed respectively Dec. 8, 1945, and March 4, 1946, Patent Nos. 2,478,552 and 2,532,-587), and the present invention has for its principal object the provision of means for anchoring the inner metal pipe of the assembly by plates transversely of the pipe axis so that all longitudinal expansion and contraction of the pipe in use will take place on one or both sides of the anchored point.

Other features and advantages of the invention will appear in the following description and accompanying drawings.

In the drawings Fig. 1 is a longitudinal vertical section of the simplest form of my insulated anchor applied to an insulated pipe of the type above mentioned.

Fig. 2 is a cross section of Fig. 1 taken along the line 2—2 of Fig. 1.

Fig. 3 is a cross section as of Fig. 1 taken along the line 3—3 of Fig. 1 and with extending anchoring legs added (as depicted in Fig. 2 of my parent application of which this is a division in part).

Fg. 4 is a sectional view like that of Fig. 1 but showing a modified form made by reversing the position of the inner and outer plates.

Fig. 5 is a similar sectional view to Fig. 4 but shows a further modification of housing in the inner plates as shown for the single inner plate of Fig. 1.

Fig. 6 is a detail showing a modification for Fig. 1.

Before describing the drawings in detail it may be stated that Fig. 1 is a copy of Fig. 3 of the parent application.

Fig. 2 is an obvious cross section of Fig. 3 of the present case. Figs. 3, 4, and 5 are obvious modifications of the original disclosure of the parent case but as they were not actually shown in the original drawings, this case has been termed a division in part of the parent case Serial 655,294.

In the drawings, 1 is the inner conveyor pipe, generally a steam pipe or one used for conveying hot fluids, 2 is the thermal insulation closely surrounding the pipe, and which may be of any suitable kind of thermal insulating material, though preferably is the conventional magnesia base steam pipe packing applied in split sections to the pipe and wrapped with one or more layers 2' of cloth; 4 is a thick impervious layer of solid asphalt, tar, pitch, or other like material pourable when heated and solidifying upon cooling, which surrounds the cloth-wrapped thermal insulation to prevent the ingress of water, 5 is the sheet metal tubular casing which surrounds the pitch, while 3 is one of any type of spacer or spacing ring used at intervals along the assemblage to definitely space the sheet metal casing 5 from the thermal insulation to provide a space for the pitch 4 which is poured in while in molten condition into the casing space through one or more side openings in the casing, not shown, but well understood in the art. The numerals used on Fig. 1 are the same as used on the same showing (Fig. 3) of my parent case Serial 655,294 to preserve its identity therewith.

All the above features are old and well known, and my improvement applied thereto as exemplified in Fig. 1 of the drawing, comprises a metal plate such as a substantially rigid anchor plate of steel 8 extending radially outward, preferably at right angles to the conveyor pipe 1, and which may be in one or two pieces provided with an opening or notches to pass pipe 1 therethrough, the plate having engagement with conveyor pipe 1 fixed against relative longitudinal movement therebetween, and is preferably firmly welded thereto as at 9, though it may also be loose on the inner pipe and stopped against movement longitudinally of the pipe by being positioned between two small lugs or flanges 8' as shown in Fig. 6 which are themselves welded or otherwise fixedly secured to the pipe.

In Fig. 1 the anchor plate 8 may be round, square or oblong, or any other shape and it is spacedly enclosed within a thick metal housing, preferably plate steel, comprising two side plates 18 which project radially beyond the diameter of the casing 5 and are joined and sealed at their outer edges by a suitable cover plate or plates 22 preferably welded thereto as at 19.

Side walls or plates 18 extend inwardly and each is formed with an opening of greater diameter than the diameter of conveyor pipe 1 and preferably circumferentially embraces inner conveyer or steam pipe 1, whereby the plates 18 are spaced from and insulated relative to the conveyor pipe.

At opposite sides of the anchor housing are two relatively short heavy metal tubes 10 each of which has one end sealed to an outer face of the respective opposite side walls 18 as by welding as at 19. These tubes are of a diameter to telescope at their other or outer ends snugly enclosing the ends of the metal pipe casing 5 and are sealed thereto as by welding, brazing or solder joint 24 or otherwise. Thus, the tubes 10 become the outer casing in the area of the conduit which they enclose. A material which is impervious to moisture, such as a pitch or solid asphalt filling 4 extends between the outer circumference of the thermal insulation 2 and the enclosing tubes 10 and casing 5, in their respective areas up to the side walls 18 of the housing, since these side walls are thermally insulated from conveyor pipe 1. In this connection it may be here noted that in all figures and modifications of the invention the moisture impervious filler 4 stops short of contact with and is thermally insulated from respective anchor members which have direct or positive bearing on or connection to the conveyor pipe 1.

The periphery of anchor plate 8 is spaced radially inwardly from the outer wall 22 of the housing as well as longitudinally from its side walls 18, and these spaces therebetween are filled with a heat insulating material preferably of rigid form or sufficiently hard to stay the anchor members and side plates against relative movement being designated longitudinal spacer insulation 20 and radial spacer insulation 21, the latter providing thermal insulation between the radially outer edge of plate 8 and the outer peripheral housing plate 22. This material may be preformed blocks of any suitable asbestos cement mixture, or may be cast in place, or the spaces may be filled with wooden blocks formed to fit, as some woods are of high insulating properties. Any interstices should be filled with thermal cement.

With the construction as above described, and shown in Figs. 1 and 2 it will be seen that the housing 18, 22, projecting outwardly of the pipe assembly is thermally insulated from the inner pipe 1, also sealed against ingress of water, yet is rigid and immovable longitudinally of the pipe, to thereby serve as an anchor against linear expansive movement of the pipe if the housing is suitably secured or locked in place to some immovable object, to some exterior immovable object.

The locking of the housing in a fixed position to an immovable object obviously may be made in several ways by securing it to some immovable wall or foundation, one of such ways is to embed it in a concrete foundation block as shown dotted at 15'. Another way is to provide one or more iron legs or extensions from the housing which are secured to the foundation or wall as the case may be. Such legs are shown in Fig. 3 at 16 welded or otherwise secured to the housing and imbedded in a concrete foundation 15, though it is obvious the extensions may be of any shape and bolted or otherwise secured to any immovable wall or block. The employment of the legs 16 provides the advantage that by severing the legs at the foundation block, the conduit system may be removed if desired.

In the modifications shown in Figs. 4 and 5 instead of using but one plate secured to the pipe and a pair of housing plates insulatedly embracing it, the position of the plates is reversed.

In Figs. 4 and 5 the corresponding parts bear the same numerals as for the figures previously described to preserve their identity therewith, but in Figs. 4 and 5 two relatively spaced plates secured fixedly to the pipe 1 are designated 8", and the blocks or hard thermal insulation are designated 20' and 21', though the blocks of insulation positioned on the outsides and outer edges of the two plates 8" fixed to the inner conveyor pipe may be of softer insulation if desired as they are not subject to compression. In Fig. 4, a central plate 25 is longitudinally spaced centrally of plates 8" by the hard insulation 20' and insulated from the pipe 1 by a body of circumferential insulation 21'. The plate projects radially outward beyond the abutting ends of tubes 10 and forms the anchor plate. This plate 25 may be round, square, oblong or any desired form, with or without legs 16 as shown for Fig. 3, or may be bolted directly to any foundation or wall or embedded in concrete.

With reference to all figures of the drawing it is to be observed that insulation members 20 and 20' may be termed longitudinal insulating members because they space and thermally insulate between elements longitudinally, whereas the insulation members 21 and 21' may be termed radial insulating members because they provide a body of thermal insulation at either an inner or an outer edge of the plate members whose plane is radial to the axis of conveyor pipe 1, as is also the fact relative to the insulation body 2 in the exemplification of Fig. 1.

In Fig. 5 is shown another of the variations possible with my insulated anchor, and which is similar to that of Fig. 4 except that the two spaced inner plates here designated 8" are larger to gain a greater pressure surface against the hard insulation 20' and thereby reduce the unit pressure against longitudinal movement of pipe 1. This necessitates extending a metal housing 18' outward to enclose and seal the structure to the tubes 10 (or casing if tubes are not used) as described for Fig. 1. In the present variation however the central plate 25' extends radially outward beyond the housing 18' to provide a simple means for bolting it to a concrete wall as dotted at 26 or otherwise securing it to a solid foundation, as explained for the other forms of the invention described.

Each of the plates 8" and 25 in Fig. 4 and the plates 8" and 25' in Fig. 5 is provided with an opening centrally therethrough and through which the conveyor pipe 1 extends, as also in the plates 8 and 18 of Fig. 1. In Fig. 1 the opening of the center plate 8 abuts the conveyer pipe and is secured thereto and the insulation 21 is around the peripheral edge, while the relatively longitudinally spaced side plates 18 have the central openings thereof circumferential of and with insulation 2 between the conveyer pipe and the plate opening, the outer peripheral portion of the plates 18 extending beyond the circumference of the conduit for embedding in anchorage 15'.

But in Figs. 4 and 5 the central opening of respective center plates 25 and 25' are circumferentially spaced from the conveyer pipe with insulation 21' therebetween, and the relatively longitudinally spaced side plates 8" snugly encircle the conveyer pipe and are fixedly secured thereto, and are insulated at the periphery by insulation 21'.

In all figures, means for securing the respective plates to the conveyer pipe is indicated as welding 9, and the means for securing respective plates to an outer casing is indicated as welding 19.

It is also to be noted that in all exemplifications of the invention there are anchor means which extend radially beyond the conduit circumference for anchoring in some kind of anchorage exterior of the conduit, and that all of the plates of the anchor structure which have connection to the conveyer pipe 1 at the central opening of the plate are surrounded at the outer periphery of the plate by a body of thermal insulation material. It will be also observed that all of the plates of the anchor structure which extend radially beyond the circumference of the conduit for contact with exterior objects are circumferentially spaced from the conveyer pipe 1 by insulation at the central opening of the plates; further, all plates in contact with the conveyer pipe are longitudinally spaced from the plates parallel thereto which do not contact the conveyer pipe, and there is a body of thermal insulation longitudinally therebetween, indicated 20 in Fig. 1 and 20' in Figs. 4 and 5. Thus the anchor eliminates thermal conductivity between the conveyer pipe 1 and objects or anchorages exterior of the conduit with which the anchor comes in contact.

Since most, and certainly many, thermal insulating materials are also very efficient electrical insulators, obviously in providing thermal insulation, there may be also provided insulation from electrolysis.

From the above it will be evident to anyone skilled in the art that still other modifications may be made within the spirit of the invention and as sought to be covered in my appended claims.

I claim:

1. An anchor for an insulated pipe conduit assembly of an inner conveyor pipe enclosed within a thermal insulating jacket, in turn enclosed within a layer of solidified moisture impervious material, in turn enclosed within an outer casing, the anchor structure having a portion extending radially outwardly beyond the circumference of the conduit assembly for anchorage in a foundation externally of the conduit, and said anchor including a plurality of plate members relatively spaced longitudinally of the conduit and having opposed faces transversely of the axis of the conduit, at least one of said plates having an inner edge portion circumferential of the conveyor pipe and fixedly connected thereto for preventing relative longitudinal movement therebetween, the plate so connected to the conveyor pipe having an outer casing peripherally therearound, said last mentioned plate extending radially outwardly from the conveyor pipe and being of lesser diameter than the outer casing around its periphery whereby the periphery of said plate is spaced from the outer casing therearound providing insulation space between said plate periphery and said outer casing; and another of said plates having its inner edge spaced from the circumference of the conveyor pipe, the outer portion of the last mentioned plate extending radially outwardly beyond the portion of the outer casing which houses the layer of moisture impervious material; and means between the opposed faces of said plates maintaining them in longitudinally spaced relation, the layer of moisture impervious material terminating in spaced relation to plates fixedly connected to the conveyor pipe, and thermal insulation material interposed between said moisture impervious layer and plates fixedly connected to the conveyor pipe.

2. In a conduit pipe assembly having an exteriorly thermally insulated inner conveyor pipe enclosed within a tubular outer casing, anchor means for anchoring said inner conveyor pipe against longitudinal movement relative to an external foundation, including a plurality of plates transversely of the conveyor pipe and relatively spaced longitudinally thereof, each plate having an opening centrally through which the conveyor pipe extends, at least one of said plate members being fixedly connected at its said opening to the conveyor pipe for preventing longitudinal movement therebetween, the periphery of said plate being spaced inwardly from the outer casing therearound, and another of said plates having the edge of its said opening of greater diameter than the diameter of the conveyor pipe whereby the edge of the opening in said last mentioned plate is spaced from the conveyor pipe so as to be free of contact therewith, said last mentioned plate extending outwardly beyond said outer casing and providing means for securing that plate to an external foundation; and thermal insulation positioned between the opposed faces of said plate members and between the conveyor pipe and the adjacent edge of the plate member which extends beyond said outer casing.

3. An anchor structure as set forth in claim 2, and in which there is thermal insulation material between the periphery of said fixedly connected plate members and the outer casing therearound.

4. In a conduit pipe assembly having an exteriorly thermally insulated conveyor pipe enclosed within a tubular outer casing, anchor means for anchoring said inner conveyor pipe against longitudinal movement relative to an external foundation, comprising a plurality of plate members mounted transversely of and relatively longitudinally spaced on the conveyor pipe, each of said plates having a central opening therethrough through which the conveyor pipe extends, a pair of said relatively spaced plate members having engagement with said conveyor pipe fixed against longitudinal movement relative thereto, said pair of plates being of less diameter than the outer casing providing a space between the periphery of said plates and the outer casing, another plate mounted on the conveyor pipe in spaced relation between said pair of plates and having its central opening of greater diameter than the conveyor pipe and free of connection therewith, said last mentioned plate extending outwardly beyond said outer casing to provide a plate portion for securing to an external foundation, the outer casing abutting opposite faces of the last mentioned plate and being sealed thereto against entry of water into the casing, and thermal insulation positioned between relatively opposed faces of said last mentioned plate and said first mentioned pair of plates.

THOMAS F. M. WILLIAMSON.

REFERENCES CITED

The following references are of record in the file of this patent:

UNITED STATES PATENTS

| Number | Name | Date |
|---|---|---|
| 451,941 | La Point et al. | May 12, 1891 |
| 2,081,867 | Gysling | May 25, 1937 |
| Re. 22,988 | McLeish | Mar. 16, 1948 |

FOREIGN PATENTS

| Number | Country | Date |
|---|---|---|
| 430,811 | France | Aug. 23, 1911 |